United States Patent
King et al.

(10) Patent No.: US 8,595,054 B2
(45) Date of Patent: Nov. 26, 2013

(54) PARKING METER AND A DEVICE THEREFOR

(75) Inventors: David William King, Rancho Santa Fe, CA (US); Alexander Schwarz, San Diego, CA (US)

(73) Assignee: IPS Group Inc., Rancho Santa Fe, CA (US)

( * ) Notice: Subject to any disclaimer, the term of this patent is extended or adjusted under 35 U.S.C. 154(b) by 322 days.

(21) Appl. No.: 12/095,914

(22) PCT Filed: Dec. 4, 2006

(86) PCT No.: PCT/IB2006/054574
§ 371 (c)(1),
(2), (4) Date: Oct. 20, 2008

(87) PCT Pub. No.: WO2007/063530
PCT Pub. Date: Jun. 7, 2007

(65) Prior Publication Data
US 2009/0159674 A1    Jun. 25, 2009

Related U.S. Application Data

(60) Provisional application No. 60/741,920, filed on Dec. 2, 2005.

(51) Int. Cl.
*G06Q 99/00* (2006.01)

(52) U.S. Cl.
USPC ... 705/13; 368/90; 368/7; 368/8; 340/870.02; 340/932.2

(58) Field of Classification Search
USPC ......................... 705/13; 368/7, 8, 90; D10/42; 340/870.02, 932.2
See application file for complete search history.

(56) References Cited

U.S. PATENT DOCUMENTS 2,161,046 A    6/1939  Hitzeman
2,822,682 A    2/1958  Sollenberger
(Continued)

FOREIGN PATENT DOCUMENTS

CA    2377010       12/2001
EP    0980055 B1    2/2000
(Continued)

OTHER PUBLICATIONS

International Preliminary Report on Patentability dated Mar. 15, 2012 for International Application No. PCT/US2010/047907, 6 pages.

(Continued)

*Primary Examiner* — Akiba Allen
(74) *Attorney, Agent, or Firm* — Wilson, Sonsini, Goodrich & Rosati

(57) ABSTRACT

A single bay parking meter device is provided which accepts payment by means of a credit or debit card, an electronic purse, or coins. The device has a power supply unit, a solar power charging arrangement and power management, such that it does not need power supply cables to be installed for each meter. The parking meter device also transmits financial data to a financial institution in a wireless manner, also to avoid the need for cabling. The parking meter device is receivable in the base of a conventional single bay parking meter, such that the new parking meter device may be retrofitted to existing coin operated installed single bay parking meters, using a new cover that is also engageable with the conventional housing base.

16 Claims, 8 Drawing Sheets

(56) References Cited

U.S. PATENT DOCUMENTS

| | | | |
|---|---|---|---|
| 2,832,506 | A | 4/1958 | Hatcher |
| 2,988,191 | A | 6/1961 | Grant |
| 3,721,463 | A | 3/1973 | Attwood et al. |
| 4,812,805 | A | 3/1989 | Lachat et al. |
| 4,823,928 | A | 4/1989 | Speas |
| 4,825,425 | A | 4/1989 | Turner |
| 4,875,598 | A | 10/1989 | Dahl |
| 4,880,097 | A | 11/1989 | Speas |
| 5,065,156 | A | 11/1991 | Bernier |
| 5,222,076 | A | 6/1993 | Ng et al. |
| 5,244,070 | A | 9/1993 | Carmen et al. |
| 5,273,151 | A | 12/1993 | Carmen et al. |
| 5,360,095 | A | 11/1994 | Speas |
| 5,442,348 | A | 8/1995 | Mushell |
| 5,563,491 | A | 10/1996 | Tseng |
| 5,614,892 | A | 3/1997 | Ward, II et al. |
| 5,617,942 | A | 4/1997 | Ward et al. |
| 5,648,906 | A | 7/1997 | Amirpanahi |
| 5,659,306 | A | 8/1997 | Bahar |
| 5,778,067 | A | 7/1998 | Jones et al. |
| 5,806,651 | A | 9/1998 | Carmen et al. |
| 5,833,042 | A | 11/1998 | Baitch et al. |
| 5,841,369 | A | 11/1998 | Sutton et al. |
| 5,842,411 | A | 12/1998 | Johnson |
| 5,852,411 | A | 12/1998 | Jacobs et al. |
| 5,954,182 | A | 9/1999 | Wei |
| 6,111,522 | A * | 8/2000 | Hiltz et al. ............... 340/932.2 |
| 6,116,403 | A | 9/2000 | Kiehl |
| 6,195,015 | B1 | 2/2001 | Jacobs et al. |
| 6,229,455 | B1 | 5/2001 | Yost et al. |
| 6,230,868 | B1 | 5/2001 | Tuxen et al. |
| 6,309,098 | B1 * | 10/2001 | Wong ............................ 368/94 |
| 6,312,152 | B2 | 11/2001 | Dee et al. |
| 6,456,491 | B1 | 9/2002 | Flannery et al. |
| 6,457,586 | B2 | 10/2002 | Yasuda et al. |
| 6,505,774 | B1 | 1/2003 | Fulcher et al. |
| 6,747,575 | B2 | 6/2004 | Chauvin et al. |
| 6,856,922 | B1 | 2/2005 | Austin et al. |
| 6,914,411 | B2 | 7/2005 | Couch et al. |
| 6,929,179 | B2 | 8/2005 | Fulcher et al. |
| 7,019,420 | B2 | 3/2006 | Kogan et al. |
| 7,183,999 | B2 | 2/2007 | Matthews et al. |
| 7,222,031 | B2 | 5/2007 | Heatley |
| 7,237,716 | B2 | 7/2007 | Silberberg |
| 7,388,349 | B2 | 6/2008 | Elder et al. |
| 7,748,620 | B2 | 7/2010 | Gomez et al. |
| 7,772,720 | B2 | 8/2010 | McGee et al. |
| 7,854,310 | B2 | 12/2010 | King et al. |
| 7,855,661 | B2 | 12/2010 | Ponert |
| 7,933,841 | B2 | 4/2011 | Schmeyer et al. |
| 2001/0012241 | A1* | 8/2001 | Dee et al. ....................... 368/90 |
| 2001/0047278 | A1 | 11/2001 | Brookner et al. |
| 2001/0051531 | A1 | 12/2001 | Singhal et al. |
| 2002/0008639 | A1 | 1/2002 | Dee et al. |
| 2003/0092387 | A1 | 5/2003 | Hjelmvik |
| 2003/0112597 | A1 | 6/2003 | Smith |
| 2003/0121754 | A1 | 7/2003 | King |
| 2003/0128010 | A1 | 7/2003 | Hsu |
| 2003/0128136 | A1 | 7/2003 | Spier et al. |
| 2003/0132840 | A1 | 7/2003 | Bahar |
| 2003/0140531 | A1 | 7/2003 | Pippins |
| 2003/0144972 | A1 | 7/2003 | Cordery et al. |
| 2003/0169183 | A1 | 9/2003 | Korepanov et al. |
| 2003/0179107 | A1 | 9/2003 | Kibria et al. |
| 2004/0068434 | A1 | 4/2004 | Kanekon |
| 2004/0084278 | A1 | 5/2004 | Harris et al. |
| 2004/0181496 | A1* | 9/2004 | Odinotski et al. ............ 705/418 |
| 2004/0264302 | A1 | 12/2004 | Ward |
| 2005/0178639 | A1 | 8/2005 | Brumfield et al. |
| 2005/0192911 | A1 | 9/2005 | Mattern |
| 2006/0021848 | A1 | 2/2006 | Smith |
| 2006/0116972 | A1* | 6/2006 | Wong ............................ 705/418 |
| 2006/0149684 | A1 | 7/2006 | Matsuura et al. |
| 2006/0152349 | A1* | 7/2006 | Ratnakar ................... 340/426.1 |
| 2006/0267799 | A1 | 11/2006 | Mendelson |
| 2007/0016539 | A1 | 1/2007 | Groft et al. |
| 2007/0094153 | A1 | 4/2007 | Ferraro |
| 2007/0114849 | A1 | 5/2007 | Falik et al. |
| 2007/0119682 | A1 | 5/2007 | Banks et al. |
| 2007/0136128 | A1 | 6/2007 | Janacek et al. |
| 2008/0071611 | A1 | 3/2008 | Lovett |
| 2008/0093454 | A1 | 4/2008 | Yamazaki et al. |
| 2008/0147268 | A1 | 6/2008 | Fuller |
| 2008/0208680 | A1 | 8/2008 | Cho |
| 2008/0238715 | A1 | 10/2008 | Cheng et al. |
| 2008/0245638 | A1 | 10/2008 | King et al. |
| 2009/0026842 | A1 | 1/2009 | Hunter et al. |
| 2009/0032368 | A1 | 2/2009 | Hunter et al. |
| 2009/0095593 | A1 | 4/2009 | King et al. |
| 2009/0109062 | A1 | 4/2009 | An |
| 2009/0159674 | A1 | 6/2009 | King et al. |
| 2009/0183966 | A1 | 7/2009 | King et al. |
| 2009/0192950 | A1 | 7/2009 | King et al. |
| 2009/0284907 | A1 | 11/2009 | Regimbal et al. |
| 2010/0188932 | A1 | 7/2010 | Hanks et al. |
| 2011/0057815 | A1 | 3/2011 | King et al. |
| 2011/0060653 | A1 | 3/2011 | King et al. |
| 2011/0203901 | A1 | 8/2011 | King et al. |
| 2013/0027218 | A1 | 1/2013 | Schwarz et al. |

FOREIGN PATENT DOCUMENTS

| | | |
|---|---|---|
| FR | 2837583 | 9/2003 |
| JP | 2002-099640 A | 4/2002 |
| JP | 2005-267430 A | 9/2005 |
| KR | 10-2005-0038077 A | 4/2005 |
| WO | WO-2006-095352 | 9/2006 |
| WO | WO-2009-154787 | 12/2009 |

OTHER PUBLICATIONS

International Preliminary Report on Patentability dated Mar. 6, 2012 for International Application No. PCT/US2010/047906, 5 pages.

International Preliminary Report on Patentability dated Mar. 10, 2009 in PCT application No. PCT/IB06/054574, 5 pages.

(Cell Net Data Systems) "First Wireless Monitoring of Parking Meters Results in Theft Arrests Using CellNet Data Systems Technology," PRNewswire, May 11, 1999, 2 pages.

International Search Report dated Oct. 27, 2008 in PCT application No. PCT/IB06/054574, 2 pages.

International Search Report dated Apr. 26, 2011 in PCT Application No. PCT/US2010/047907, 3 pages.

International Search Report dated Mar. 30, 2011 in PCT Application No. PCT/US2010/047906, 3 pages.

U.S. Appl. No. 13/786,387, dated Mar. 5, 2013, David William King.

Flatley, "In San Francisco, Hackers Park for Free," Read filed under Misc. Gadgets, downloaded from www.engadget.com website on May 3, 2010, originally posted on Jul. 31, 2009, 5 pages.

Howland, S., "How M2M Maximizes Denver's Revenue," Field TechnologiesOnline.com, Oct. 2011, pp. 9-12 [online] [retrieved Mar. 5, 2013], Retrieved from http://www.fieldtechnologiesonline.com/doc.mvc/How-M2M-Maximizes-Denvers-Revenue-0001.

Meter Solutions, Single-Space Meters brochure, downloaded from www.duncansolutions.com website, revised Apr. 2006, 2 pages.

PCT/US2012/048190 International Search Report dated Jan. 22, 2013.

The U.S. Conference of Mayors Presents 'Best Practice' Awards, Los Angeles, New Orleans, Elizabeth, N.J. and Long Beach, CA Honored for Excellence & Innovation in Public-Private partnerships, Press Release Jan. 20, 2012.

\* cited by examiner

PARKING METER AND A DEVICE THEREFOR

This invention relates to single bay parking meters, device's therefor and a method of upgrading a parking meter.

In accordance with the invention there is provided a single bay parking meter device which includes
- a timer;
- a payment facilitating arrangement operable in cooperation with a non-cash payment medium for effecting payment of a monetary amount for a parking period;
- a display means for displaying a balance remaining of the parking period; and
- a power supply unit for supplying power to the timer, the payment facilitating arrangement and the display means.

A parking meter device in accordance with the invention may have an access opening in which the card may be inserted and a reading device for reading information and data on the card. The card may have a magnetic strip or a chip, such that the reading device may be such as to read a magnetic strip and/or a chip. The parking meter device may further have a writing device for writing data onto or into the card.

The payment facilitating arrangement may then have a wireless banking information transmitting means for transmitting financial transaction data to a banking system in order to debit the appropriate account, as determined from the card, and credit the account of the parking operator. The banking information transmitting means may operate on an on-line or off-line manner. It may use a cellular telephone network such as CDMA or GSM, or WI-Fi and IP Embedded Wireless.

Further according to the invention, the payment facilitating arrangement may have a wireless purse communicating means for communicating with an electronic purse, in accordance with any suitable protocol, whereby an appropriate amount may be deducted from the value stored in the purse. The banking information transmitting means will then be operable to credit the account of the parking operator with the amount by which the purse was decreased. The purse may, for example, be a toll road electronic pass. The purse communicating means may detect, in use, when a vehicle having an electronic purse parks in the relevant parking bay and then automatically deduct the appropriate amount for a predetermined time period. If the vehicle is still parked in the bay at the end of the predetermined time period, the appropriate amount is again automatically deducted. This may then occur repeatedly until such time as the maximum permitted parking time has been reached, at which time no further money is deducted and a parking expired signal is provided.

Still further according to the invention, the parking meter device may have a payment received arrangement for receiving an instruction from a call centre that payment has been effected, via the call centre, from a cellular telephone.

The parking meter device may have a solar power charging arrangement whereby the power supply unit is recharged by solar energy. The parking meter device may then also have a power management facility.

As a further feature, the parking meter device may have a locating arrangement for determining the location of the parking meter device. The locating arrangement may be GPS operable.

The parking meter device may have a management communication arrangement for communicating management information to a management centre. For example such management information may include malfunction details, a tampering alert, duration expiration and the location of the parking meter device.

The parking meter device in accordance with the invention may also have a coin accepting and validating arrangement.

It is emphasised that the parking meter device is for a single parking bay or space.

The display means may also display that the parking time paid for has expired.

The parking meter device may have a selection means for selecting the duration of parking time required and the appropriate cost thereof, whereby a person wishing to park (the "parker") may select the desired time duration.

The parking meter device in accordance with the invention may be receivable in a conventional single space parking meter housing, such as that supplied by Duncan Industries, POM or Mackay.

Further in accordance with the invention there is provided a single bay parking meter which includes a parking meter device as described above.

Still further in accordance with the invention there is provided a cover for a single bay parking meter, which is engageable with a conventional single space parking meter housing base such that the cover of an existing parking meter may be replaced with one in accordance with the invention to accommodate a parking meter device in accordance with the invention in an existing conventional housing base.

The invention extends to a method of controlling parking in a single parking bay, which includes accepting payment for parking in the bay by means of a credit or debit card account, from an electronic purse, or by means of a cellular telephone.

If payment is effected by means of a credit or debit card account, the method may include transmitting data in a wireless manner to a first financial institution to debit an account of the parker and a second financial institution to credit the account of a parking operator.

If payment is effected from an electronic purse, then the method may include transmitting financial data in a wireless manner with the first financial institution to debit an account of the purse administrator and with the second financial institution to credit the account of the parking operator.

Similarly, if payment is effected by means of a cellular telephone, then the method may include receiving an authorisation signal that payment for the parking has been made. This signal may be provided by the second financial institution or from a control centre.

Further, if payment is effected from an electronic purse, then the method may include automatically detecting that a vehicle associated with the electronic purse has parked in the bay and automatically deducting an appropriate amount from the purse for a predetermined parking time period. If the vehicle is still parked in the bay at the end of the predetermined time period a further amount may be automatically deducted from the purse for a further predetermined parking time period. This may be repeated until a maximum permitted parking time has elapsed.

The method of controlling parking may include sensing if a vehicle is parked in the bay when the paid for parking time has expired or the maximum parking time has been exceeded and transmitting a time expired signal to a management centre. A location signal, providing the location of the bay, may also be transmitted.

The invention extends further to a method of operating a single bay parking meter, which includes effecting payment for parking in a bay associated with the meter by means of a debit or credit card, electronic purse or cellular telephone.

The method of operating the parking meter may include inserting a card into a card reader slot of the meter.

The invention extends still further to a method of upgrading an existing parking meter, which includes removing a cover of the parking meter from a housing base thereof;

removing an existing parking meter device from the housing base;

attaching a new cover to the housing base;

inserting a new parking meter device as described above in the housing base; and closing the new cover.

The invention is now described, by way of a non-limiting example, with reference to the accompanying drawings, in which:—

Figure 1:
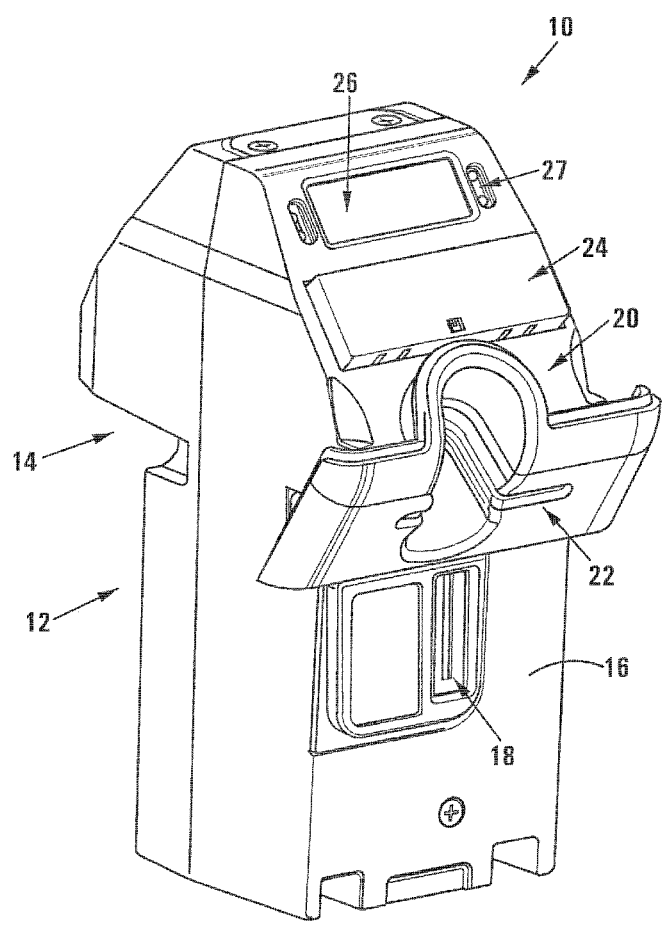
FIG. 1 shows a perspective front view of a single bay parking meter device in accordance with the invention.
Figure 2:
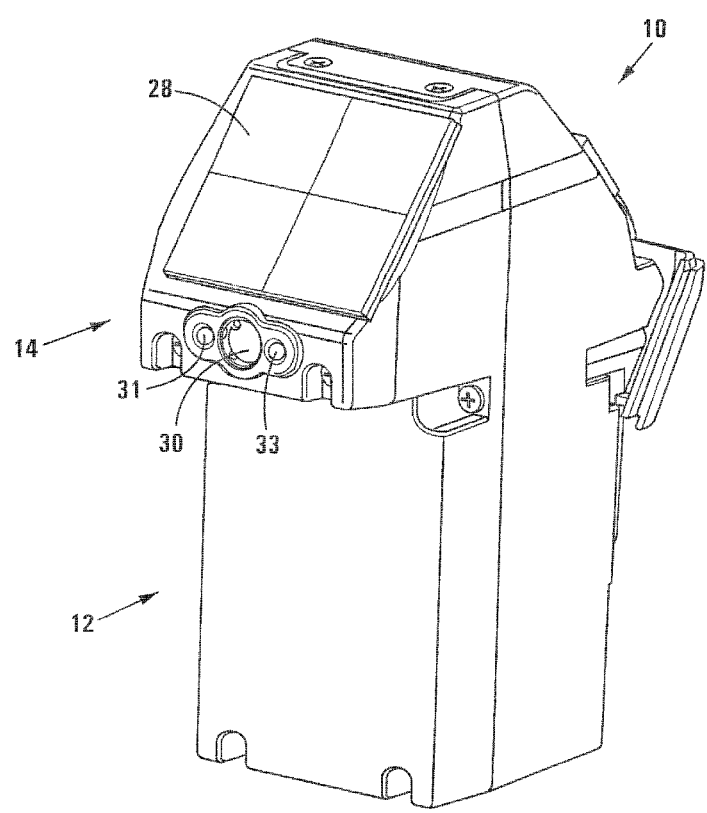
FIG. 2 shows a perspective rear view of the parking meter device.

Referring to the drawings, in particular FIGS. 1 and 2, a parking meter device in accordance with the invention is designated generally by reference numeral 10. The parking meter device 10 is for a single bay parking meter. The parking meter device 10 has a lower portion 12 and an upper portion 14. The lower portion 12 of the parking meter device 10 has the same shape and dimensions as the housing base of conventional known single bay parking meter devices. As will be explained below, because the lower portion 12 of the parking meter device in accordance with the invention has the same shape and dimensions as existing single bay parking meter devices, the parking meter device 10 in accordance with the invention is receivable in a housing base of an existing installed parking meter and the parking meter device 10 of the invention may be retrofitted to such existing installed meters, thereby upgrading them.

The lower portion 12 of the parking meter device 10 has a coin accepting and validating assembly 16 with a coin slot 18.

In the upper portion 14 of the parking meter device there is a card reading device 20 with an access opening 22, on a front side of the parking meter device 10, into which a credit or debit card may be inserted to be read by the reading device 20. Also in the upper portion 14, on its front side, are a keypad sensor 24 and a display 26. An infrared receiver and transmitter 27 are provided whereby management data and operational software may be transferred to and from a portable communication device (not shown).

On the rear side of the upper portion 14 of the parking meter device 10 (FIG. 2) there is a solar panel 28 and a flip dot expiry indicator. A red LED 31 and a green LED 33 are also provided to indicate if the paid for parking period has expired or not. In use these LED's are illuminated in a flashing manner.

Figure 3:
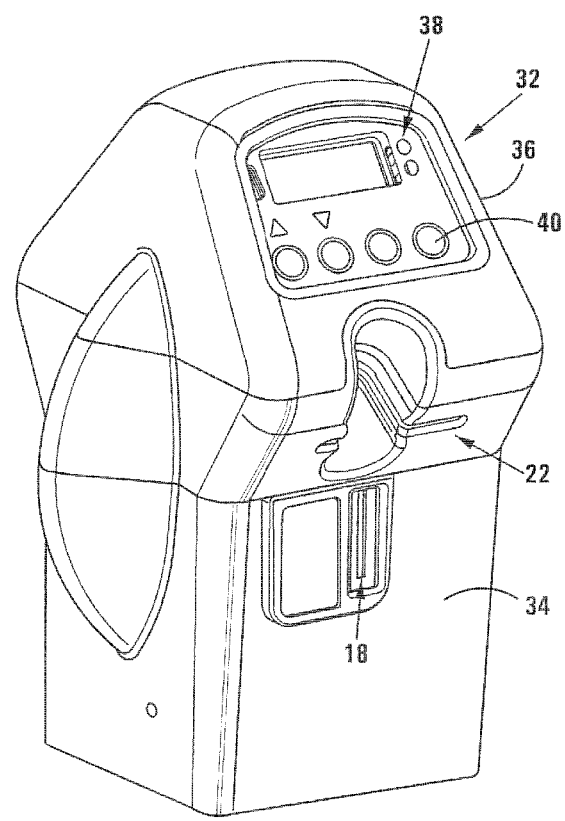
FIG. 3 shows a perspective front view of a parking meter in accordance with the invention.
Figure 4:
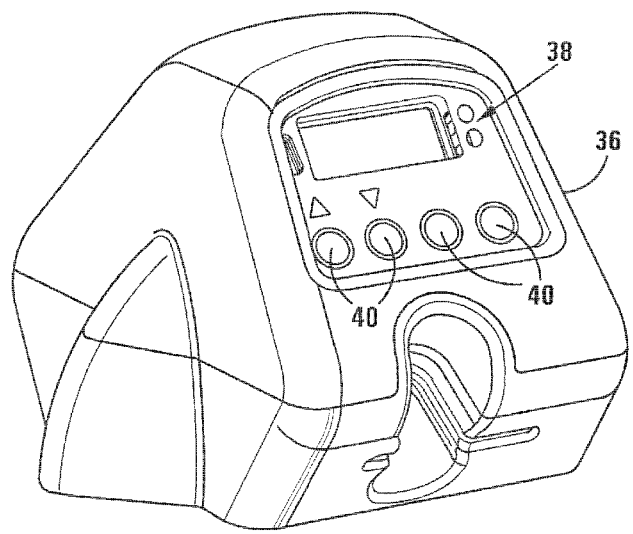
FIG. 4 shows a view in more detail of a control window of the parking meter.
Figure 5:
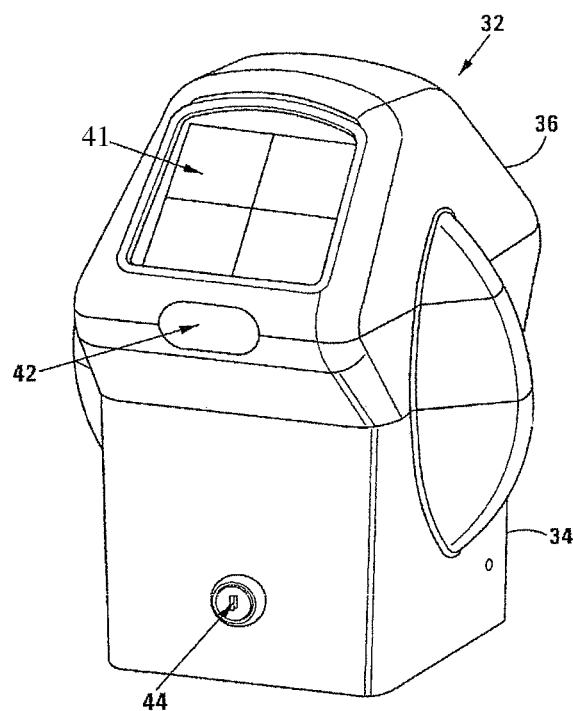
FIG. 5 shows a perspective rear view of the parking meter.

Referring now to FIGS. 3, 4 and 5 a single bay parking meter 32 is shown. The parking meter 32 has a housing base 34 which is the same as that of existing conventional single bay parking meters. It also has a cover 36 which is different from the covers of existing parking meters, and which accommodates and is adapted in accordance with the upper portion 14 of the parking meter device 10 of the invention. It will be seen that that part of the parking meter device 10 having the coin slot 18 and card reader access opening 22 are located in an opening defined between the housing base 34 and cover 36 to be accessible when the parking meter device 10 is placed in the housing 34 and the cover 36 closed.

Figure 6:
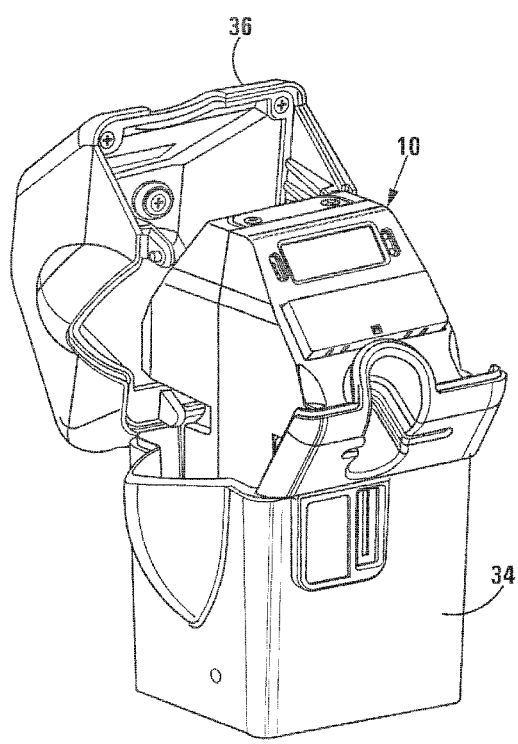
FIG. 6 shows a perspective front view of the parking meter with a cover thereof opened to provide access to the parking meter device housed therein.
Figure 7:
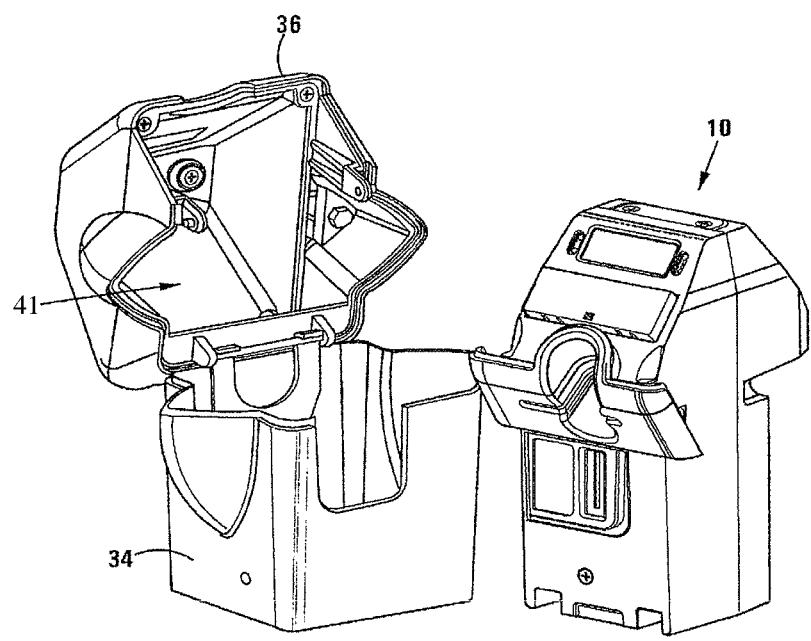
FIG. 7 shows the housing and open cover of the parking meter with the parking meter device adjacent thereto.

The cover 36 has, on its front side, a window 38 through which the display 26 is visible and control touch keys 40 which interact with the keypad sensor 24. On its rear side the cover 36 as a further window 41 for the solar panel 28. An opening 42 is provided between the housing 34 and cover 36 for the flip dot 30. A key hole 44 is located in the housing 34 by means of which the cover 36 may be unlocked and opened, as shown in FIG. 6, so that the parking meter device 10 may be removed and replaced, as shown in FIG. 7.

Figure 8:
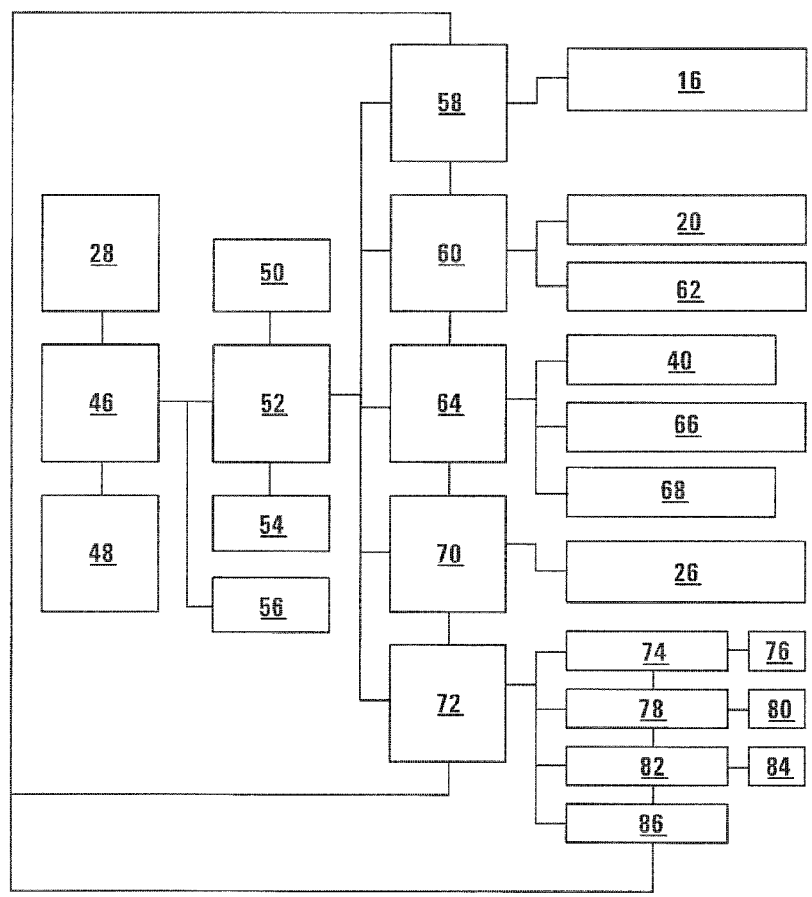
FIG. 8 shows a block diagram illustrating the components of the parking meter device.

The various electrical and other components of the parking meter device 10 are indicated in FIG. 8. Thus, the parking meter device 10 has the coin accepting and validating assembly 16, the card reading device 20, the display 26, the touch keys 40, and the solar panel 28 referred to above. In addition there is a power management facility 46, a rechargeable, replaceable battery 48, random access memory 50, a central controller 52, flash memory 54 for code, a real time clock 56, a coin validator interface 58, a card reader interface 60 for cards having chips and magnetic strips and for RF electronic purses, a receiver 62 for signals from such RF electronic purses, I/O hardware 64, sensors, switches and reset 66, an expiry indicator 68, a display driver for the display 26, a communications subsystem 72, a cellular phone engine 74 with its antenna 76, a Wi-Fi engine 78 and its antenna 80, a GPS unit 82 and its antenna 84 and a serial/USB/IrDA port 86.

The controller 52 controls operation of the meter. An integrated device is used, providing RAM, ROM, and some I/O capabilities. Power down features are of high importance when selecting the microcontroller, as the meter is typically in the idle or sleep mode. A serial port is provided for debug as well as connection to an external management system.

To minimize power consumption, special power management circuitry is provided to allow application of power to only the necessary peripherals at only the necessary times. The power management facility also provides battery status to the microcontroller to allow changes in operation based on available power, as well as health reporting to the management system.

An AMP card reader will be used as the external electrical/mechanical credit/smart card solution. One of two interfaces to the AMP device is the card head interface. A Magtek Triple Track ASIC will be used to convert the analog head signals to serial bit streams, readable by the microcontroller. The second interface to the external AMP card connector is the smart card interface. This block will provide necessary level shifting and synchronization to allow the microcontroller to bit-bang the smart card interface.

The coin validator interface 58 is an analog/digital block that connects to 3 coils in the coin validator 16. The coils are energized, and the change in inductance is measured as the coin passes through each of the coils. This profile can then be correlated by the microcontroller to a database of known coins to determine the type of coin present.

The parking meter device 10 contains a number of switches such as touch keys for user input, presence detection in the card reader, and door switches. The I/O hardware 64 allows the microcontroller to sense the state of the switches.

An expansion interface may be provided that will allow a daughter card assembly to be connected to the controller board. The communication protocol over the interface will support a minimum throughput of 20 KB/s. The expansion interface is intended to allow the addition of a communication device to the meter. Possible device types are: cellular, WiFi, Zigbee, and IrDA. Both communication signals and power will be provided through the expansion connector.

The following will be displayed on the display 26:—which of the 4 user buttons are pressed; information from a credit card; information from a smart card; which coins are passed through the coin validator.

As described in the introduction, a motorist will approach the meter and insert either a coin or card into the meter. Either method will wake up the electronic componentry and it will then either validate that it is a coin, credit card, debit/ATM card or a Smart Card. By inserting either the required number of valid coins or by inserting a card and manipulating the controls on the touch pad the motorist can determine the amount of parking time he wishes to purchase. The amount of time purchased is then displayed on the electronic display. The parking meter device will communicate with the credit card company wirelessly and authorize the payment using that card.

Payment via an electronic tag or electronic toll road pass will be as follows. The device will either sense or be advised by an electronic sensor that a motor vehicle has parked in the parking space. It will then identify the electronic tag in the vehicle and after the vehicle has been in that parking space for a predetermined time will then deduct time from the vehicles electronic tag for a predetermined length of time and display that time on the electronic device's LCD Display. After that time has been used up and the vehicle is still parked in that same parking space the device will again deduct the required amount of money from the vehicles electronic tag and display that amount of time on the device's LCD display. This process will repeat itself until the vehicle has stayed in the parking space for the maximum amount of time allowed for that parking zone or area.

At a time determined by the owner or the controller of the parking area, the device will communicate with a management system. This can be done wirelessly or through a hand held device.

The invention claimed is:

1. A parking meter device that is receivable within a housing base of a single space parking meter, the parking meter device including:
   a timer;
   a payment facilitating arrangement operable in cooperation with a non-cash payment medium for effecting payment of a monetary amount for a parking period;
   a display configured to visually provide a balance remaining of the parking period;
   a power management facility that supplies power to the timer, payment facilitating arrangement, and display;
   a wireless communications subsystem configured to receive information relating to the non-cash payment medium in respect of the payment facilitating arrangement;
   a keypad sensor that receives input comprising manipulation by the user;
   a coin slot into which coins are inserted for delivery to the coin sensor and then to a coin receptacle; and
   a lower portion and an upper portion;
   wherein the keypad sensor operates the parking meter and determines parking time amount for purchase in accordance with the received input from the user;
   wherein the display provides the amount of time purchased in response to the received input from the user;
   wherein the upper portion of the parking meter device includes a solar panel that charges the power management facility;
   wherein the lower portion of the parking meter device is configured to have a shape and dimensions such that the lower portion is receivable within the housing base of the single space parking meter; and
   wherein the upper portion of the parking meter device is covered by a cover that is configured to accommodate the upper portion and that is engageable with the housing base of the single space parking meter such that the payment facilitating arrangement is accessible by the user for user manipulation effecting the payment of the monetary amount for the parking period when the lower portion of the parking meter device is received within the housing base and the upper portion is covered by the cover.

2. The parking meter device as claimed in claim 1, in which the payment medium is a credit card or debit card.

3. The parking meter device as claimed in claim 1, in which the payment facilitating arrangement includes at least one of a card reader or a card writer.

4. The parking meter device as claimed in claim 1, in which the payment medium is an electronic purse, and in which the payment facilitating arrangement includes communicating means for communicating with the electronic purse.

5. The parking meter device as claimed in claim 1, which includes an information transmitting means for transmitting data in regard to the payment to a financial institution.

6. The parking meter device as claimed in claim 5, in which the information transmitting means is operable in a wireless manner.

7. A parking meter device as claimed in claim 1, wherein the housing base is a conventional parking meter housing base.

8. The parking meter as claimed in claim 1, wherein the solar panel is located at a rear side of the parking meter device upper portion and is configured to be visible through a solar panel window of the cover when the cover is closed over the upper portion.

9. The parking meter device as claimed in claim 1, wherein the parking meter device upper portion includes a rear side that includes an infrared receiver and transmitter that are configured for the transfer of management data and operational software.

10. The parking meter device as claimed in claim 1, wherein the display is located at the parking meter device upper portion.

11. The parking meter device as claimed in claim 10, wherein the display is configured to be visible through a display window of the cover when the cover is closed over the upper portion.

12. The parking meter device as claimed in claim 1, further including a communications subsystem that transmits management information to a management center, wherein the management information includes meter malfunction details, tampering alert, parking duration expiration, and location of the parking meter device.

13. The parking meter device as claimed in claim 12, wherein the communications subsystem transmits information via cellular telephone.

14. The parking meter device as claimed in claim 12, wherein the communications subsystem transmits information via a telecommunications network.

15. The parking meter device as claimed in claim 12, wherein the communications subsystem transmits information via an infrared port.

16. The parking meter device as claimed in claim 12, wherein the communications subsystem comprises an expansion interface that supports connection to a network communication device that provides communication signals.

* * * * *